United States Patent
Campbell

(10) Patent No.: US 10,487,805 B2
(45) Date of Patent: Nov. 26, 2019

(54) INSTRUMENTED SHAFT FOR CONDITION MONITORING

(71) Applicant: Aktiebolaget SKF, Gothenburg (SE)

(72) Inventor: Andrew Campbell, East Kilbride (GB)

(73) Assignee: AKTIEBOLAGET SKF, Göteborg (SE)

( * ) Notice: Subject to any disclaimer, the term of this patent is extended or adjusted under 35 U.S.C. 154(b) by 109 days.

(21) Appl. No.: 15/895,586

(22) Filed: Feb. 13, 2018

(65) Prior Publication Data
US 2018/0238307 A1 Aug. 23, 2018

(30) Foreign Application Priority Data
Feb. 21, 2017 (GB) .................... 1702779.8

(51) Int. Cl.
| | |
|---|---|
| *F03D 17/00* | (2016.01) |
| *F03D 15/00* | (2016.01) |
| *F16H 57/00* | (2012.01) |
| *F16H 57/01* | (2012.01) |
| *F16H 1/28* | (2006.01) |

(52) U.S. Cl.
CPC ............ *F03D 17/00* (2016.05); *F03D 15/00* (2016.05); *F16H 1/2863* (2013.01); *F16H 57/0031* (2013.01); *F16H 57/01* (2013.01); *F05B 2240/60* (2013.01); *F05B 2260/40311* (2013.01); *F05B 2260/80* (2013.01); *F05B 2270/325* (2013.01); *F05B 2270/333* (2013.01); *F05B 2270/334* (2013.01); *F05B 2270/808* (2013.01); *F16H 1/28* (2013.01); *F16H 2057/012* (2013.01); *Y02E 10/722* (2013.01)

(58) Field of Classification Search
USPC ........................................... 475/331
See application file for complete search history.

(56) References Cited

U.S. PATENT DOCUMENTS

| | | | | |
|---|---|---|---|---|
| 7,677,122 | B2* | 3/2010 | Kim ...................... | B62D 15/022 73/865.9 |
| 8,393,993 | B2* | 3/2013 | Demtroeder ............ | F03D 17/00 475/331 |
| 8,757,014 | B2* | 6/2014 | Dinter ..................... | F16H 57/01 73/862.335 |
| 8,880,359 | B2* | 11/2014 | Ince .................... | G01M 13/022 340/679 |
| 2014/0150588 | A1* | 6/2014 | Christiansson ......... | F16H 55/17 74/434 |
| 2017/0059449 | A1* | 3/2017 | Roepke ............... | G01M 13/045 |

* cited by examiner

*Primary Examiner* — Dirk Wright

(57) ABSTRACT

A flanged shaft having a shaft part including a bearing seat for mounting an inner ring of a bearing arrangement and a flange part at a first side of the shaft. The flange part has an axially inner surface for axially retaining the inner ring. The flanged shaft is instrumented with one or more sensor units. Each unit having a measuring surface formed by an axially inner surface of at least one contact plate on which one or more sensors are provided for monitoring one or more operating parameters of the bearing arrangement. According to the invention, each of the one or more sensor units is arranged in a corresponding recess that extends through the flange part such that the measuring surface lies flush with or protrudes somewhat beyond the axially inner surface of the flange part.

12 Claims, 3 Drawing Sheets

INSTRUMENTED SHAFT FOR CONDITION MONITORING

CROSS-REFERENCE

This application claims priority to British patent application no. 1702779.8 filed on Feb. 21, 2017, the contents of which are fully incorporated herein by reference.

TECHNOLOGICAL FIELD

The present invention relates generally to the field of condition monitoring of rotating parts and is more particularly directed to a shaft for supporting a bearing, which shaft is instrumented with one or more condition monitoring sensors. The invention further relates to a gearbox comprising such an instrumented shaft and to a wind turbine comprising the gearbox.

BACKGROUND

Condition monitoring is an important tool for detecting faults and adverse operating conditions of rotating machine parts, such as bearings, thereby making it possible to carry out preventive maintenance or repairs before any major failure occurs. It is particularly important in remote installations like wind turbines, which operate without supervision and where critical failures are extremely expensive to repair.

An example of condition monitoring of an epicyclic gearbox in a wind turbine is disclosed in U.S. Pat. No. 8,393,993. The gearbox has at least two planet gears, each of which is rotationally supported on a planet gear shaft by a bearing. The gearbox further has at least one planet carrier that connects the planet gears. The planet carrier is provided with one or more sensors, including a vibration sensor. In an embodiment, the planet carrier is provided with a vibration sensor placed on or in close proximity to each of the planet gear shafts.

The sensor is therefore located relatively far away from the bearing that supports the planet gear shaft, meaning that vibrations associated with bearing defects are more difficult to detect.

SUMMARY

The present invention resides in a flanged shaft comprising a shaft part, which has a bearing seat for mounting an inner ring of a bearing arrangement, and an integrally formed flange part, which has an axially inner surface for axially retaining the inner ring. The flanged shaft is instrumented with one or more sensor units, each unit having a contact plate on which one or more sensors are provided for monitoring one or more operating parameters of the bearing arrangement during use. According to the invention, each of the one or more sensor units is arranged in a corresponding recess which extends through the flange part, such that the axially inner surface of the contact plate lies flush with or protrudes somewhat beyond the axially inner surface of the bearing.

Thus, in use of the flanged shaft, the sensorized contact plate of each sensor unit is in contact with a side face of the bearing inner ring, enabling accurate detection of the operating parameters.

The one or more sensors may comprise at least one of a vibration sensor, a temperature sensor, an acoustic emission sensor and a strain sensor. In an embodiment, the sensor unit is equipped with two or more different sensors. The different sensors may be attached to a single contact plate of the sensor unit. In an alternative embodiment, the sensor unit has first and second contact plates to which different sensors are attached.

Preferably, the flanged shaft comprises at least two sensor units, to enable operating parameters of the bearing to be measured at different locations on the inner ring. In one embodiment, the flanged shaft has four sensor units arranged at even angular intervals around the circumference of the flanged shaft. As will be understood, different numbers of sensor units and different arrangements thereof are possible, depending on the application and the operating parameters of interest.

Suitably, each sensor unit comprises electronics for receiving and preferably also processing the data from the one or more sensors, and further comprises an antenna for wireless transmission of the sensor data. Each sensor unit may also comprise its own power source within a housing of the unit. In some applications, however, the dimensions of the shaft flange and the available space within the application may not allow the sensor units to accommodate their own power sources.

Thus, in an advantageous further development, the flanged shaft is provided with a power source for supplying electricity to each of the sensor units. A cavity is provided in an axially outer surface of the shaft part of the flanged shaft, at the flange side thereof. More space is available in the shaft part, which is also structurally more robust. The cavity is sufficiently large to accommodate one or more batteries, which are connected to the sensor units at the axially outer side. Suitably, the batteries and the axially outer end of the sensor units is then covered by a cover plate, to protect against the ingress of oil and contaminants. The flanged shaft thus becomes an autonomous component that can be easily mounted in a planetary gearbox without the need for complex wiring on e.g. the planet carrier.

At the opposite end of the sensor unit, the unit housing is suitably provided with a seal that surrounds the contact plate, to protect against the ingress of oil and contaminants Advantageously, the contact plate is spring-mounted to the unit housing, so that in use of the flanged shaft, the contact plate is urged into contact with the side face of the bearing inner ring that axially abuts the shaft flange. In addition, the housing itself may be spring mounted within its recess, enabling displacement of the housing in axial direction relative to the flanged shaft, such that in use of the shaft, the seal is urged against the side face of the bearing inner ring.

The flanged shaft of the invention is particularly suitable for use in a planetary gearbox comprising two or more planet gears, each of which is rotationally supported by a bearing arrangement on a planet gear shaft. At least one of the planet gear shafts is executed as a flanged shaft according to the invention. The planet gear shafts are fixed to a planet carrier, which is typically a cast component having first and second sides. The flanged shaft may be supported within a bore in the planet carrier at the flange side. At the shaft side, the shaft may be fixed to the planet carrier via e.g. bolts.

In an embodiment, the bearing arrangement comprises axially spaced first and second bearings. An inner ring of the first bearing is axially retained by the flange part of the flanged shaft and an inner ring of the second bearing is axially retained by a flange part of the planet carrier. To enable condition monitoring of the second bearing, the gearbox is advantageously provided with at least one further sensor unit as described above, which is arranged in a recess that extends through the flange part of the carrier so as to be in contact with a side face of the inner ring of the second bearing. Preferably, two or more further sensor units are provided, depending on the available space.

In a further development, the flanged shaft of the invention is equipped with a power source for supplying electricity to the further sensors units which are provided through the planet carrier. A second cavity is provided in an end face of the shaft part, at the side opposite from the flange side, and one or more batteries are accommodated in the second cavity. Suitably, at the location of the second cavity, the planet carrier comprises an opening that enables access to the batteries in the second cavity, so that connections wires may be arranged between the batteries and the further sensor units.

A planetary gearbox comprising a flanged shaft according to the invention is particularly suitable for use in a wind turbine, and will now be described further with reference to the accompanying figures.

DETAILED DESCRIPTION

Figure 1A:
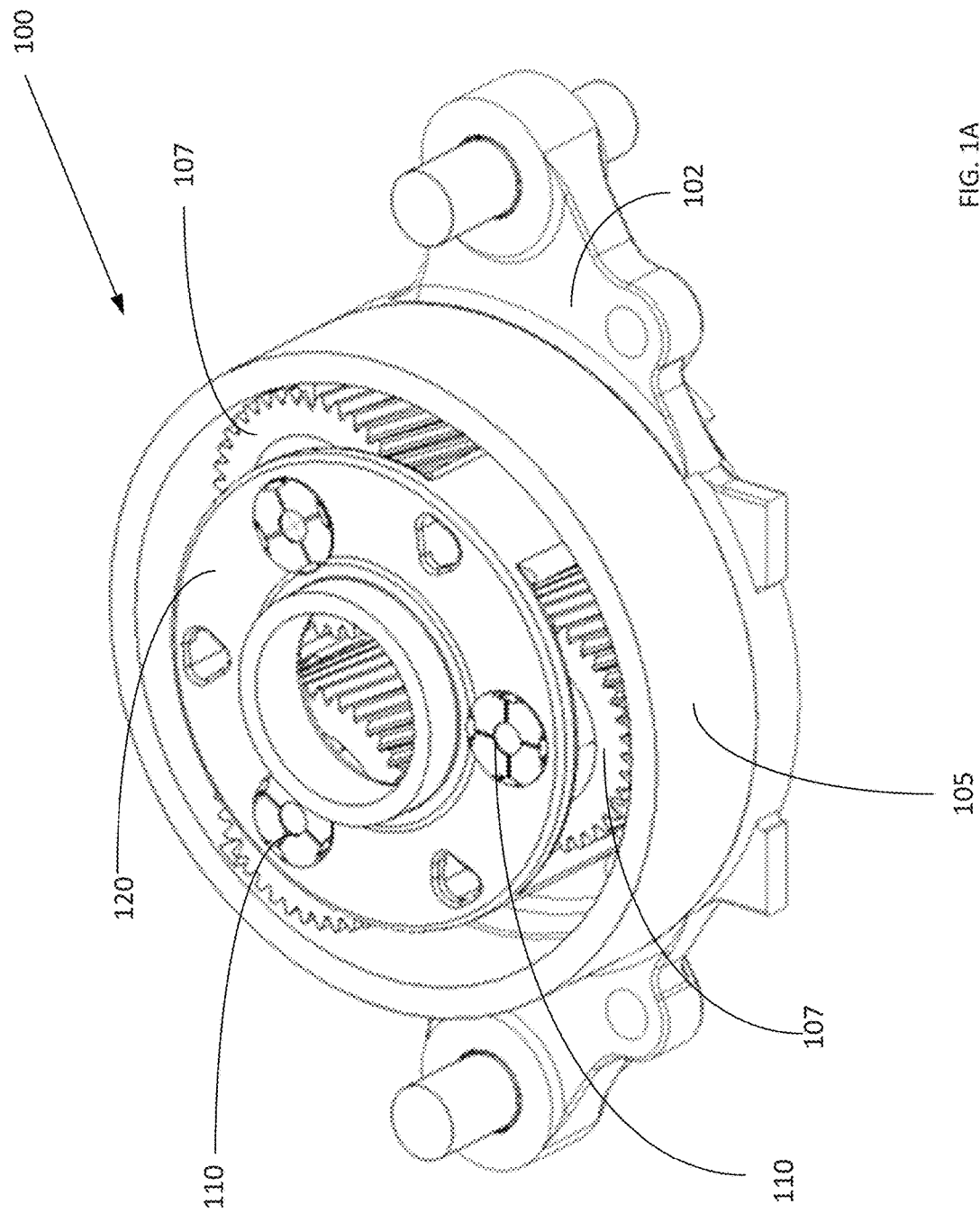
FIG. 1A shows a perspective view of a planetary gearbox comprising a number of planet gears, each of which is mounted on a flanged shaft according the invention.
Figure 1B:
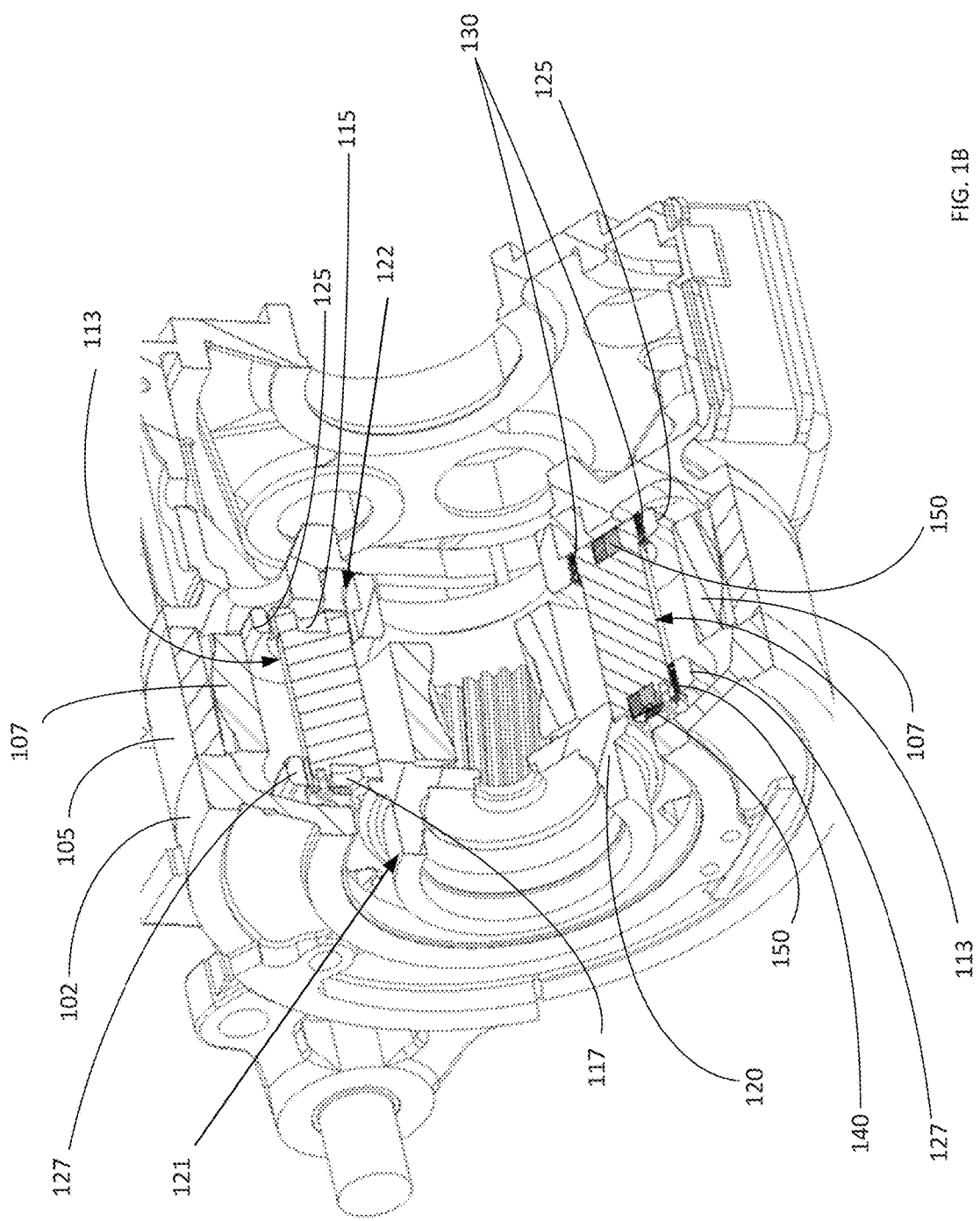
FIG. 1B is cut perspective view of the gearbox from FIG. 1A.

FIG. 1A shows a perspective view of a first stage of a planetary gearbox 100, which is suitable for use in a wind turbine drive train that connects a main rotor of the wind turbine with a generator. A cut perspective view of the gearbox is shown in FIG. 1B, in which part of a housing for a second stage is also visible. In the depicted example, the gearbox 100 has a fixed ring gear 105 mounted to the housing 102, a sun gear (not shown) and three planet gears 107 arranged around the sun gear such that gear teeth of each planet gear 107 are in meshing engagement with gear teeth of the sun gear and of the ring gear 105.

Each planet gear 107 is rotationally supported on a corresponding planet gear shaft 110 via a bearing arrangement (not shown). The planet gear shafts 110 are fixed to a planet carrier 120, which in this example is rotationally supported relative to the casing 102 by first and second bearings whose respective locations are indicated in FIG. 1B by arrows 121 and 122. The planet carrier 120 is adapted to be coupled to an input shaft (not shown), which is itself directly or indirectly coupled to the main rotor of the wind turbine. Driven rotation of the planet carrier 120 causes rotation of the planet gears 107 which drive the sun gear at a faster output speed than the input speed of the input shaft. The sun gear may be directly coupled to an output shaft that drives the generator, or may be indirectly coupled to the output shaft via one or more further stages of the gearbox 100.

The bearing arrangements that support the planet gears 107 are critical components of the gearbox 100. Early detection of operating conditions that could accelerate the end of bearing life is therefore important, so that e.g. a maintenance alert can be transmitted. According to the invention, this is achieved by executing the planet gear shafts as a flanged shaft, instrumented with one or more sensor units.

Figure 2A:
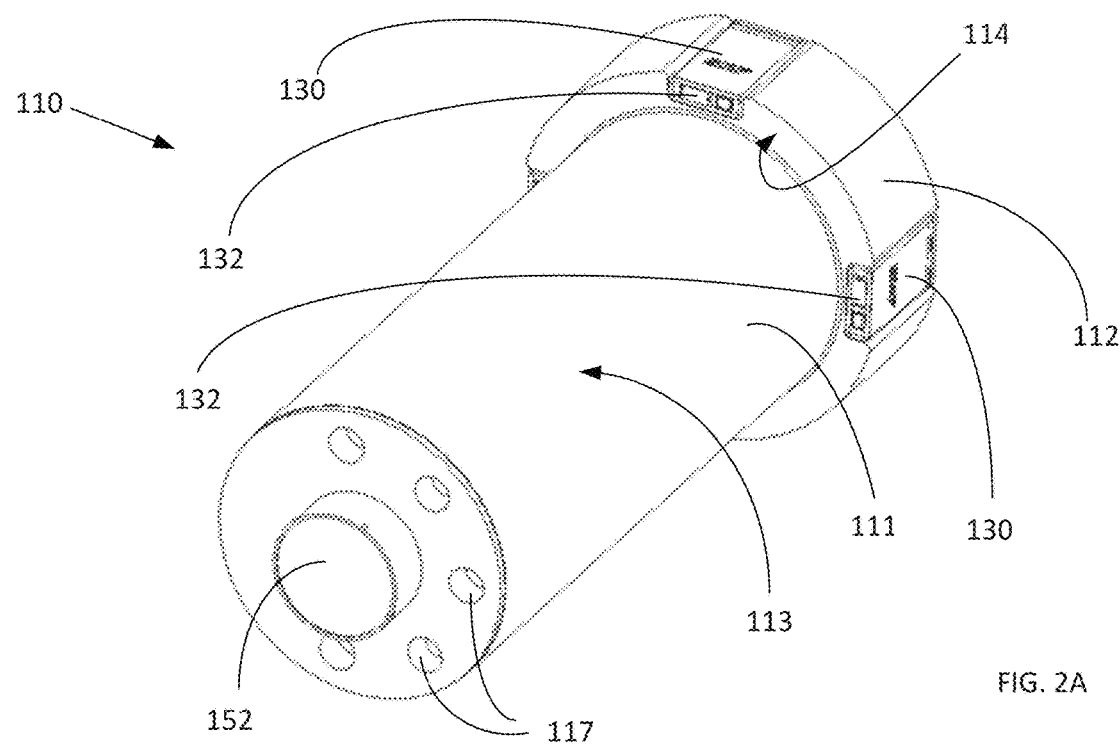
FIG. 2A shows an example of a flanged shaft according to the invention comprising a number of sensor units.

A perspective view of a flanged shaft according to the invention in shown in FIG. 2A. The shaft 110 has a shaft part 111 and an integrally formed flange part 112. An outer cylindrical surface 113 of the shaft part serves as a seat for at least one inner ring of a bearing arrangement. Typically, the bearing arrangement comprises at least two rows of rollers, and may be a double row roller bearing unit or an arrangement of two separate bearings. A matched pair of tapered roller bearings in back-to-back arrangement is one example of a bearing arrangement that is commonly used to support planet gears in a gearbox.

The invention will be described further with regard to such an arrangement of first and second tapered roller bearings, although as will be understood, the flanged shaft 110 may be used to support any suitable kind of bearing.

In use of the flanged shaft, an inner ring of the first and second tapered roller bearings is mounted on the bearing seat 113 of the shaft section such that the first inner ring of the first bearing is axially retained by the flange part 112 of the shaft. An axial side face of the first inner ring is thus in contact with an axially inner surface 114 of the flange part 112. In the depicted example, the shaft 110 is provided with four sensor units 140, each of which is provided in a recess that extends through the flange part 112 from an axially outer surface to the axially inner surface 114. Each sensor unit 130 has a sensing surface 132 formed by an axially inner surface of a plate on which one or more sensors are provided and is configured such that in use, the sensing surface is in contact with the side face of the first inner ring. Accurate detection of bearing operating parameters is thus ensured.

Figure 2B:
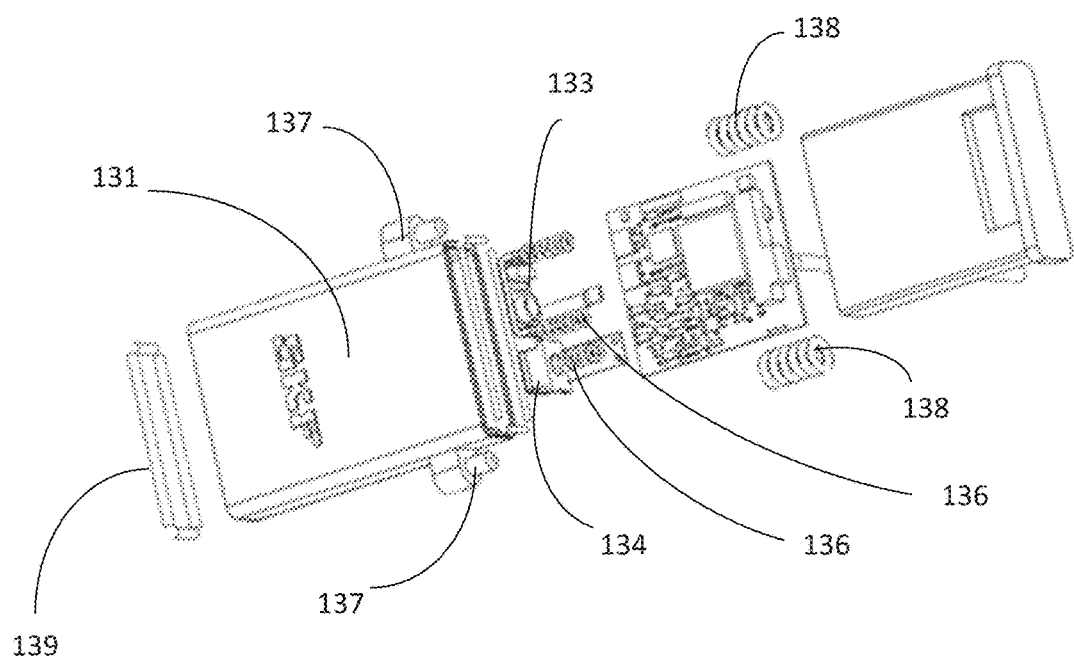
FIG. 2B shows components of a sensor unit from FIG. 2A.

An exploded view of the sensor unit 130 and its components is shown in FIG. 2B. The unit has a housing 131 that accommodates a circuit board 133, to which the one or more sensors are connected. The circuit board suitably comprises electronics for processing and transmitting signals received from the sensors. Preferably the unit 130 is equipped with an antenna for wireless data transmission.

In the depicted example, the sensing surface of the unit is formed by first and second contact plates provided at the respective underside of first and second sensor sleds 134, 135. The contact plates are preferably made of a metallic material. A vibration sensor, an acoustic emission sensor and a temperature sensor are provided on the contact plate of the first sensor sled 134. The sensors may be mounted on a flexible PCB that is adhered to the contact plate of the first sled 134 and is connected to the main circuit board 133. A strain sensor is provided on the contact plate of the second sensor sled 135. The strain sensor may be a friction strain gauge or a piezo strain gauge.

In use of the shaft, the sensing surface 132 is in contact with the side face of the first bearing inner ring. Suitably, the sleds 134, 135 are spring loaded within the housing 131 via springs 136, to ensure that firm contact is maintained. In addition, the housing 131 of the unit may be spring loaded against the flanged shaft 110. Each side of the housing is provided with a spring holder 137 for receiving a further spring 138. One end of the spring bears against the spring holder 137, the opposite end may be axially retained by a cover plate that is e.g. screwed to the axially outer surface of the flange part 112.

Preferably, the unit is further provided with a face seal 139 that is attached to the housing 131 at an axially inner end thereof and which surrounds the sensing surface 132, to protect the sensors from oil and other contaminants. Before the bearing arrangement is mounted on the bearing seat 113 of the flanged shaft, the unit is suitably adapted such that the axially inner end of the housing protrudes somewhat beyond the axially inner surface 114 of the flange part 112 of the shaft 110. When the bearing arrangement is mounted, the side face of the first inner ring presses against the face seal 138 and axially displaces the unit housing 131 relative to the flange part 112 of the shaft, via the further springs 138, until the ring is in contact with the axially inner surface 114 of the flange part 112. A tight seal is thus maintained between the sensor unit and the bearing ring in use of the shaft.

Depending on the dimensions of the flanged shaft, the sensor unit housing 131 may be large enough to accommodate a battery for powering the sensors and the electronics. In a preferred embodiment, as may be seen in FIG. 1B, a cavity 115 is provided in the flanged shaft 110, in an axially outer surface of the shaft, at the flange side, which will be referred to as the first axial side. The cavity is arranged radially inward of the recesses through the flange part 112 of the shaft, and accommodates one or more batteries 150 which are connected to the sensor units 130.

In the depicted example, each sensor unit 130 is provided in a slot machined into an outer circumference of the flange part 112, such that the unit is enclosed on three sides by the flange. The surface of the unit that faces radially outward is covered in use of the shaft 110 by a cylindrical bore of a first flange part 125 of the planet carrier 120, at the first side of the carrier. Suitably, the cavity 115 and batteries 150 are enclosed by the cover plate mentioned above, which axially retains the sensor units at the first side of the shaft 110. The flanged shaft of the invention thus provides a self-contained assembly for supporting a bearing arrangement and monitoring its condition, which can be installed in a straightforward manner.

In bearing arrangements where first and second bearings are mounted on the flanged shaft, it is advantageous if operating parameters of the second bearing are also measurable. In the embodiment depicted in FIG. 1B, one or more further sensor units 140 are provided at the second axial side of the shaft 110 and of the carrier 120, which units have a sensing surface in contact with a side face of the inner ring of the second bearing. In the depicted example, three further sensor units 140 are provided.

The planet gear shafts 110 are secured to the planet carrier 120 at the second side thereof. A second flange part 127 is provided in the carrier for each planet gear shaft 110, whereby an axially inner surface of the second carrier flange 127 axially retains the inner ring of the second bearing. The second side of the shaft (refer FIG. 2A) comprises fixation holes 117 and corresponding fixation holes are e.g. drilled through the carrier. A recess for each of the one or more further sensor units 140 is machined through the second carrier flange 127, such that the sensing surface of each sensor unit is in contact with the side face of the second inner ring of the bearing arrangement that supports each planet gear 107. The further sensor units may be identical to the sensor unit described with reference to FIG. 2B, whereby the sensors are mounted on spring-loaded sleds and the sensor housing is spring-loaded relative to the second carrier flange 127.

Advantageously, the one or more further sensor units are powered by at least one battery 150 that is accommodated in a second cavity 117 at the second side of the flanged shaft 110. Referring to FIG. 2A, a battery box 152 for housing the at least one battery may be provided in the cavity 117 at the second axial side, whereby a section of the battery box protrudes from the axial end face of the shaft part 111. Suitably, a correspondingly shaped hole is machined into the planet carrier 120, to enable each further sensor unit 140 to be connected to the power supply in the battery box 152. After connection of the further sensor units 140, a cover plate with fixation holes may be screwed onto the second carrier flange 127, whereby the screws extend into the fixation holes 117 in the planet gear shaft 110.

The foregoing detailed description has been provided by way of explanation and illustration, and is not intended to limit the scope of the appended claims. Many variations in the presently preferred embodiments illustrated herein will be apparent to one of ordinary skill in the art, and remain within the scope of the appended claims and their equivalents.

What is claimed is:

1. A flanged shaft comprising:
a shaft part having a bearing seat for mounting an inner ring of a bearing arrangement and an integrally formed flange part (112) at a first side of the shaft. the flange part has an axially inner surface for axially retaining the inner ring, wherein
the flanged shaft is instrumented with one or more sensor units, each unit having a measuring surface formed by an axially inner surface of at least one contact plate on which one or more sensors are provided for monitoring one or more operating parameters of the bearing arrangement, and wherein
each of the one or more sensor units is arranged in a corresponding recess that extends through the flange part such that the measuring surface lies flush with or protrudes somewhat beyond the axially inner surface of the flange part.

2. The flanged shaft of claim 1, further comprising a cavity provided in an axially outer surface of the flanged shaft, at the first side thereof, wherein one or more batteries are arranged in the cavity and are electrically connected to each sensor unit.

3. The flanged shaft of claim 1, wherein at least one of the sensor units is arranged in a slot provided at an outer circumference of the flange part.

4. The flanged shaft according to claim 1, wherein the contact plate of each sensor unit is spring-mounted to a housing of the sensor unit, enabling displacement of the measuring surface in axial direction relative to the housing.

5. The flanged shaft according to claim 1, wherein a housing of each sensor unit is spring-mounted within the corresponding recess, enabling displacement of the housing in axial direction relative to the flanged shaft.

6. The flanged shaft of according to claim 1, wherein the one or more sensors comprise at least one of a vibration sensor, a temperature sensor, an acoustic emission sensor and a strain sensor.

7. A planetary gearbox comprising:
two or more planet gears, wherein
at least one of the planet gears is rotationally supported by a bearing arrangement mounted on the flanged shaft according to claim 1, wherein
at a first side of the bearing arrangement, a first inner ring of the arrangement is axially retained by the flange part of the shaft and is in contact with the sensing surface of the at least one sensor unit.

8. The planetary gearbox of claim 7, further comprising a planet carrier having first and second sides, wherein
the flange part of the flanged shaft is arranged at the first side of the carrier; the shaft part is fixed to the carrier at a second side thereof; and wherein the carrier has a flange part at the second side which axially retains a second inner ring of the bearing arrangement.

9. The planetary gearbox of claim 8, comprising at least one further sensor unit arranged in a recess that extends through the flange part of the carrier, such that a sensing surface of the further sensor unit is in contact with the second inner ring of the bearing arrangement.

10. The planetary gearbox of claim 9, further comprising a second cavity being provided in an end face of the shaft part, at a second side of the flanged shaft (110), wherein one or more batteries are accommodated in the second cavity and are in electrical connection with the at least one further sensor unit.

11. The planetary gearbox of claim 10, wherein at the location of the second cavity, the planet carrier comprises an opening that enables access to the second cavity.

12. A wind turbine comprising the planetary gearing box according to claim 7.

* * * * *